United States Patent
Genoni

(10) Patent No.: US 6,769,719 B2
(45) Date of Patent: Aug. 3, 2004

(54) MULTILAYER TUBE WITH BUTT WELDABLE END AND WELDING METHOD FOR A MULTILAYER TUBE

(75) Inventor: Massimo Genoni, Sasso Morelli (IT)

(73) Assignee: Nupi S.p.A., Imola (IT)

( * ) Notice: Subject to any disclaimer, the term of this patent is extended or adjusted under 35 U.S.C. 154(b) by 0 days.

(21) Appl. No.: 10/271,792

(22) Filed: Oct. 17, 2002

(65) Prior Publication Data

US 2003/0080552 A1 May 1, 2003

(30) Foreign Application Priority Data

Oct. 26, 2001 (IT) .................................. M12001A2257

(51) Int. Cl.[7] .................................................. F16L 13/02
(52) U.S. Cl. .................. 285/288.5; 285/21.2; 285/55; 285/285.1
(58) Field of Search ............................. 285/21.2, 21.3, 285/21.1, 55, 53, 288.5, 285.1

(56) References Cited

U.S. PATENT DOCUMENTS

| | | | | |
|---|---|---|---|---|
| 3,596,931 A | * | 8/1971 | Mishler | 285/55 |
| 4,718,698 A | * | 1/1988 | Hill | 285/21.2 |
| 4,927,184 A | * | 5/1990 | Bourjot et al. | 285/21.1 |
| 5,143,407 A | * | 9/1992 | Cokeh | 285/55 |
| 5,364,130 A | * | 11/1994 | Thalmann | 285/21.2 |
| 5,480,196 A | * | 1/1996 | Adams, Jr. | 285/55 |
| 5,566,984 A | * | 10/1996 | Abbema et al. | 285/55 |
| 5,824,179 A | * | 10/1998 | Greig | 285/21.2 |
| 6,375,226 B1 | * | 4/2002 | Dickinson et al. | 285/21.2 |
| 6,406,063 B1 | * | 6/2002 | Pfeiffer | 285/21.2 |
| 6,428,054 B1 | * | 8/2002 | Zappa et al. | 285/21.1 |

* cited by examiner

*Primary Examiner*—David Bochna
(74) *Attorney, Agent, or Firm*—Jacobson & Holman PLLC

(57) ABSTRACT

A weldable plastic tube has at least one end designed to be butt welded and designed for the conveyance of a fluid producing a drop in mechanical resistance of the weldable plastic. The tube includes an internal layer for protection of the plastic of the tube from contact with the fluid conveyed and adjoining the welding end has a terminal section permanently covered with an external reinforcing sleeve also of weldable plastic to participate in the butt welding of the tube. The sleeve has a thickness such as to make the mechanical resistance of the tube section nearest the welded end at least equal to the mechanical resistance of the tube not in contact with the fluid when in contact with the fluid in the welding zone which will be without the internal protective layer.

16 Claims, 1 Drawing Sheet

MULTILAYER TUBE WITH BUTT WELDABLE END AND WELDING METHOD FOR A MULTILAYER TUBE

BACKGROUND OF THE INVENTION

The present invention relates to a multilayer tube with ends suited to butt welding.

In particular the present invention relates to tubes realized with an internal layer of material suited to preservation of the external layer from the aggressive action of the fluid conveyed but with only the external layer of material enjoying the weldability features desired for the tube union.

In the field of tubing the advantages of tubing of polyethylene (PE) and similar materials are well known. For example, flexibility, lightness, environmental corrosion resistance and the possibility of using a choice of one of three different welding technologies (socket, butt and induction melting) allow resolving effectively any application problem in the conveyance of fluids such as water and gas. Polyethylene however is not resistant to hydrocarbons and in particular to solvents. This has in fact limited its use in industry and in particular oil applications.

To obviate the limitations of PE there was recently developed a new technology going under the name of 'multilayer tubing'. The technique consists of co-extruding inside the polyethylene of a thin layer (termed 'liner') of thermoplastic resistant to hydrocarbons, for example nylon, EVOH, PVDF et cetera. The internal layer prevents the hydrocarbons from coming into contact with the polyethylene which, thanks to its good mechanical features and low cost, constitutes the structural layer of the tubing and obviates the limitations of tubing of only PE.

Since the materials used as the liner are not compatible with polyethylene, to obtain perfect adhesion between the layers one or more adhesives termed 'tie-layer' are used. Although this technique offers a solution to the realization of relatively economical tubes of low thickness and resistant to hydrocarbons it introduces the problem of easy and convenient joining of tubes.

To seek to remedy this new problem techniques have been proposed using special unions or sleeves with chambers receiving the tube head and welded by thermoelectric adhesion systems on the outer wall of the PE tube. For relatively large diameters, for over 160 mm, the electrical sleeves are however rather costly.

In the prior art there are no reliable solutions for more economical and easier butt welding.

The general purpose of the present invention is to remedy the above mentioned shortcomings by making available a butt welding method and a multilayer tube allowing simple and fast butt welding.

SUMMARY OF THE INVENTION

In view of this purpose it was sought to provide in accordance with the present invention a weldable plastic tube having at least one end designed to be butt welded and designed for the conveyance of a fluid producing a drop in mechanical resistance of said weldable plastic and comprising an internal layer for protection of the plastic of the tube from contact with the fluid conveyed and with a terminal section of the tube adjoining said welding end permanently covered with an external reinforcing sleeve also of weldable plastic to participate in the butt welding of the tube with the sleeve having a thickness such as to make the mechanical resistance of the tube section nearest the welded end when in contact with the fluid in the welding zone without the internal protective layer at least equal to the mechanical resistance of the tube not in contact with the fluid.

A butt welding method is also claimed.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
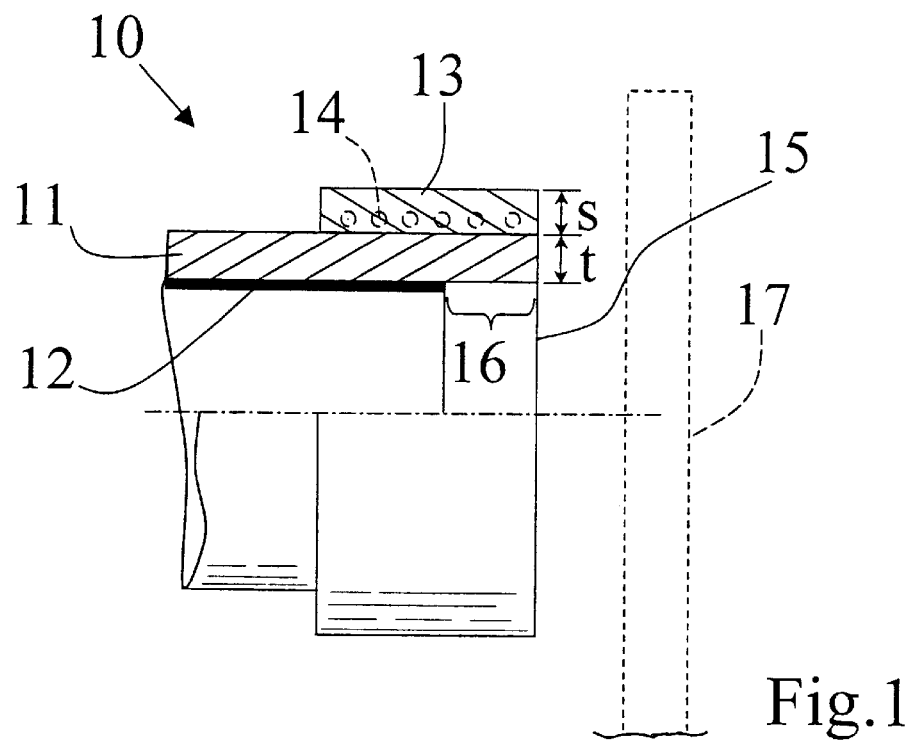
FIG. 1 shows a partially cross sectioned partial side view of a tube realized in accordance with the present invention.

With reference to the FIGS, FIG. 1 shows a tube designated as a whole by reference number 10 realized in accordance with the present invention. This tube has walls 11 realized of weldable material and with good mechanical features such as PE which is relatively economical but has low resistance to the fluids conveyed, for example hydrocarbons, and with a thin internal protective layer of material having adequate resistance to said fluid to have a desired nominal pressure. The technique for production of tubes with a protective internal layer is known and not further discussed herein. The material of the protective layer can be chosen advantageously from among polyamides, EVOH, PVDF, organic polyamide/polyethylene or polyamide/polypropylene alloys.

On the free end of the tube it is desired to butt weld is fixed externally a sleeve 13 of the same weldable material as the tube. This sleeve is fastened to the tube by gluing or melting which can be realized by conventional and well known socket or induction melting welding techniques. In the latter case the sleeve comprises electrical resistances (shown in broken lines at reference number 14) to produce induction melting. The head surfaces of the sleeve and tube thus realize a single front surface 15 for welding.

The internal layer 12 terminates before said front surface 15 but within the zone of the tube enclosed by the sleeve to leave an internal zone 16 of the sleeve uncovered. The zone 16 can be approximately 5 to 20 mm wide depending on the tube diameter. Removal of the internal layer can be done for example by grinding. The sleeve can advantageously have a length at least twice the width of the uncovered section 16.

In this manner the end of the tube consists exclusively of polyethylene and has increased thickness.

The butt union between two tubes with ends in accordance with the present invention is realized by conventional techniques for the butt union of single layer polyethylene tubes for example using an electric tool 17 on which the face 15 to be welded is temporarily rested. The technique of butt welding single layer tubes is well known and not further described or shown as it is readily imaginable to those skilled in the art.

Figure 2:
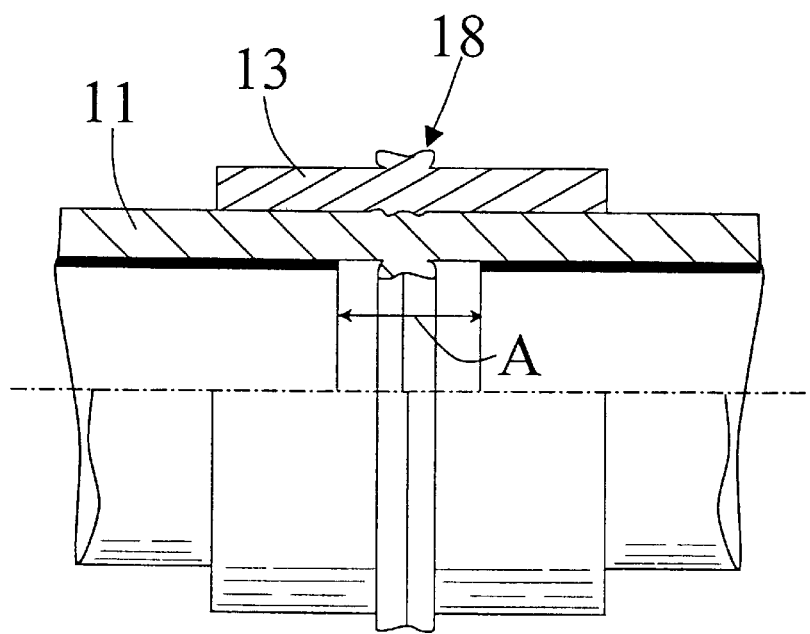
FIG. 2 shows a view similar to that of FIG. 1 of two ends of a tube in accordance with the present invention after their butt welding.

FIG. 2 shows a butt union between two tube ends in accordance with the present invention where the weld bead 18 is seen.

The thickness S of the reinforcing sleeve 13 is calculated so that the nominal pressure of the polyethylene section A which is uncovered and in contact with the aggressive fluid and which is created in the tube after welding be at least equal to the nominal pressure of the tubing protected by the internal layer resistant to the fluid conveyed. In this manner the small section of PE tube (small especially for the typical lengths of the tubes between two successive unions) which will be in contact with the fluid does not change the resistance of the tubing thus realized. In other words, the mechanical resistance of the tube section protected by the reinforcing sleeve and without a protective layer but still in contact with the fluid will be at least equal to the resistance of the tube not in contact with the fluid. The s:t ratio between the thickness s of the reinforcement and the thickness t of the tube depends on the nominal pressure of the tube and the fluid conveyed. For hydrocarbons and nominal pressures between 8 and 20 bar the ratio is between 1 and 5 and in particular between 1.2 and 4.3.

It is now clear that the purposes of the present invention have been achieved.

By the method in accordance with the present invention the tube with end sleeves can be conveniently prepared at a distance and the easy, fast and economical butt union can be made in the field.

Naturally the above description of an embodiment applying the innovative principles of the present invention is given by way of non-limiting example of said principles within the scope of the exclusive right claimed here. For example the sleeve can have differentiated thickness along its length and taper where it draws away from the welding face. In addition, the weldable plastic tube can also comprise in it reinforcements of other materials such as glass or carbon fiber arranged continuously or not as readily imaginable to those skilled in the art.

What is claimed is:

1. A tube having at least one end to be butt welded and for conveyance of a fluid producing a drop in mechanical resistance, said tube comprising
   an external layer made of weldable plastic,
   an internal protective layer located inside the external layer for protection of the external layer from contact with the fluid conveyed,
   a terminal section of the external layer adjoining said at least one end to be butt welded, said internal protective sleeve extending up to said terminal section and stopping short of the at least one end to be butt welded, and
   an external reinforcing sleeve covering said external layer at said at least one end to be butt welded, said external reinforcing sleeve being made of said weldable plastic to participate in the butt welding of the at least one end with the external reinforcing sleeve having a thickness such as to make a mechanical resistance of a tube section of said external layer nearest the at least one end when in contact with the fluid in a welding zone without the internal protective layer at least equal to mechanical resistance of the external layer not in contact with the fluid.

2. The tube in accordance with claim 1, wherein the internal protective layer terminates in said terminal section before reaching the at least one end.

3. The tube in accordance with claim 2, wherein a length of said external reinforcing sleeve is at least twice a width of the terminal section without the internal protective layer.

4. The tube in accordance with claim 1, wherein the tube and the external reinforcing sleeve are made of polyethylene.

5. The tube in accordance with claim 1, wherein the internal protective layer is made of a material resistant to hydrocarbons and chosen from among polyamide, EVOH, PVDH, and organic polyamide/polyethylene or polyamide/polypropylene alloys.

6. The tube in accordance with claim 1, wherein the external reinforcing sleeve has internal electrical heating resistances for fastening to the tube by induction melting.

7. The tube in accordance with claim 1, wherein the external reinforcing sleeve has one end arranged flush with an end of another tube to be butt welded.

8. The tube in accordance with claim 1, wherein a ratio s:t between a thickness s of the external reinforcing sleeve and thickness t of the tube is between 1 and 5.

9. The tube as claimed in claim 8, wherein the ratio is between 1.2 and 4.3.

10. A method for a butt connection at an end of a weldable plastic tube designed for conveyance of a fluid producing a drop in mechanical resistance of said weldable plastic tube and the weldable plastic tube having an internal protective layer for protection of the weldable plastic tube from contact with the fluid conveyed, said method comprising the steps of:
    permanently covering an end section of the tube adjoining said end to be welded with an external reinforcing sleeve of weldable plastic with a thickness such that after butt welding the mechanical resistance of the tube section near the welded end when in contact with the fluid in a welding zone without an internal protective layer will be at least equal to a mechanical resistance of the tube not in contact with the fluid, and butt welding of the tube end and the external reinforcing sleeve.

11. The method in accordance with claim 10, further comprising the additional step of removing a terminal section of the internal protective layer in an internal zone of the external reinforcing sleeve before butt welding.

12. The method in accordance with claim 11, wherein the terminal section of the protective layer is removed for a length not greater than one half a length of the external reinforcing sleeve.

13. The method in accordance with claim 10, wherein the external reinforcing sleeve is fastened to the tube by gluing.

14. The method in accordance with claim 10, wherein the external reinforcing sleeve is fastened to the tube by induction welding by electrical resistances inside said external reinforcing sleeve.

15. The method in accordance with claim 10, wherein the external reinforcing sleeve is arranged on the tube with one end of the external reinforcing sleeve flush with the end of the tube to be butt welded.

16. A tube for the conveyance of a fluid said tube comprising
    an external layer made of weldable plastic,
    an internal layer for protection of the external layer from contact with the fluid conveyed, the tube having at least two lengths joined together by butt welding of respective ends, each of said respective ends having a terminal section permanently covered with an external reinforcing sleeve also of said weldable plastic to be butt welded along with participate in the butt welding of the two lengths of the tube, the external reinforcing sleeve having a thickness such as to make a mechanical resistance of a tube section nearest the welded end when in contact with the fluid in a welding zone without the internal protective layer at least equal to a mechanical resistance of the tube not in contact with the fluid.

* * * * *